United States Patent
Mishra et al.

(10) Patent No.: US 7,734,176 B2
(45) Date of Patent: Jun. 8, 2010

(54) HYBRID OPTICAL BURST SWITCHING WITH FIXED TIME SLOT ARCHITECTURE

(75) Inventors: Manav Mishra, Kirkland, WA (US); Christian Maciocco, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 1865 days.

(21) Appl. No.: 10/743,213

(22) Filed: Dec. 22, 2003

(65) Prior Publication Data

US 2005/0135806 A1  Jun. 23, 2005

(51) Int. Cl.
*H04J 14/00* (2006.01)
(52) U.S. Cl. .......................................... 398/47; 398/54
(58) Field of Classification Search .................... 398/46, 398/47, 54
See application file for complete search history.

(56) References Cited

U.S. PATENT DOCUMENTS

| | | | |
|---|---|---|---|
| 4,663,748 A | 5/1987 | Karbowiak et al. | |
| 5,235,592 A | 8/1993 | Cheng et al. | |
| 5,331,642 A | 7/1994 | Valley et al. | |
| 5,457,556 A | 10/1995 | Shiragaki | |
| 5,477,364 A * | 12/1995 | Pearson | 398/54 |
| 5,506,712 A | 4/1996 | Sasayama et al. | |
| 5,550,803 A | 8/1996 | Crayford et al. | |
| 5,559,796 A | 9/1996 | Edem et al. | |
| 5,646,943 A | 7/1997 | Elwalid | |
| 5,768,274 A | 6/1998 | Murakami et al. | |
| 5,838,663 A | 11/1998 | Elwalid et al. | |
| 5,970,050 A | 10/1999 | Johnson | |
| 5,978,356 A | 11/1999 | Elwalid et al. | |
| 6,111,673 A | 8/2000 | Chang et al. | |
| 6,222,839 B1 | 4/2001 | Nakazaki et al. | |
| 6,260,155 B1 | 7/2001 | Dellacona | |
| 6,271,946 B1 | 8/2001 | Chang et al. | |
| 6,272,117 B1 | 8/2001 | Choi et al. | |
| 6,325,636 B1 | 12/2001 | Hipp et al. | |
| 6,339,488 B1 | 1/2002 | Beshai et al. | |
| 6,400,863 B1 | 6/2002 | Weinstock et al. | |
| 6,411,506 B1 | 6/2002 | Hipp et al. | |
| 6,421,720 B2 | 7/2002 | Fitzgerald | |

(Continued)

FOREIGN PATENT DOCUMENTS

CN  1384618  12/2002

(Continued)

OTHER PUBLICATIONS

Dolzer, Klaus et al., "Evaluation of Reservation Mechanisms for Optical Burst Switching", Sep. 18-19, 2000, Institute of Communication Networks and Computer Engineering, University of Stuttgart.

(Continued)

*Primary Examiner*—Nathan M Curs
(74) *Attorney, Agent, or Firm*—Blakely, Sokoloff, Taylor & Zafman LLP

(57) ABSTRACT

A system and method for a cell switching optical network. A block of data is buffered at an edge node and sliced into data slices. Slice headers are pre-appended to each data slice. The data slices are then scheduled for transmission onto an optical switching network during fixed time slots defined on a per carrier wavelength basis.

8 Claims, 5 Drawing Sheets

U.S. PATENT DOCUMENTS

| | | |
|---|---|---|
| 6,466,586 B1 | 10/2002 | Darveau et al. |
| 6,487,686 B1 | 11/2002 | Yamazaki et al. |
| 6,490,292 B1 | 12/2002 | Matsuzawa |
| 6,498,667 B1 | 12/2002 | Masucci et al. |
| 6,519,062 B1 | 2/2003 | Yoo |
| 6,519,255 B1 | 2/2003 | Graves |
| 6,525,850 B1 | 2/2003 | Chang et al. |
| 6,542,499 B1 | 4/2003 | Murphy et al. |
| 6,545,781 B1 | 4/2003 | Chang et al. |
| 6,603,893 B1 | 8/2003 | Liu et al. |
| 6,615,382 B1 | 9/2003 | Kang et al. |
| 6,665,495 B1 | 12/2003 | Miles et al. |
| 6,671,256 B1 | 12/2003 | Xiong et al. |
| 6,674,558 B1 | 1/2004 | Chang et al. |
| 6,690,036 B2 | 2/2004 | Liu et al. |
| 6,697,374 B1 | 2/2004 | Shraga et al. |
| 6,721,271 B1 | 4/2004 | Beshai et al. |
| 6,721,315 B1 | 4/2004 | Xiong et al. |
| 6,839,322 B1 | 1/2005 | Smith |
| 6,842,424 B1 | 1/2005 | Key et al. |
| 6,873,797 B2 | 3/2005 | Chang et al. |
| 6,898,205 B1 | 5/2005 | Chaskar et al. |
| 6,925,257 B2 | 8/2005 | Yoo |
| 6,940,863 B2 | 9/2005 | Xue et al. |
| 6,956,868 B2 | 10/2005 | Qiao |
| 6,987,770 B1 | 1/2006 | Yonge, III |
| 6,990,071 B2 | 1/2006 | Adam et al. |
| 6,996,059 B1 | 2/2006 | Tonogai |
| 7,023,846 B1 | 4/2006 | Andersson et al. |
| 7,035,537 B2 | 4/2006 | Wang et al. |
| 7,092,633 B2 | 8/2006 | Fumagalli et al. |
| 7,106,968 B2 | 9/2006 | Lahav et al. |
| 7,277,634 B2 * | 10/2007 | Ovadia .................. 398/45 |
| 2002/0018263 A1 | 2/2002 | Ge et al. |
| 2002/0018468 A1 | 2/2002 | Nishihara |
| 2002/0023249 A1 | 2/2002 | Temullo et al. |
| 2002/0024700 A1 | 2/2002 | Yokoyama et al. |
| 2002/0027686 A1 | 3/2002 | Wada et al. |
| 2002/0063924 A1 | 5/2002 | Kimbrough et al. |
| 2002/0071149 A1 * | 6/2002 | Xu et al. .................. 359/110 |
| 2002/0109878 A1 | 8/2002 | Qiao |
| 2002/0118419 A1 | 8/2002 | Zheng et al. |
| 2002/0126337 A1 | 9/2002 | Uematsu et al. |
| 2002/0141400 A1 | 10/2002 | DeMartino |
| 2002/0150099 A1 | 10/2002 | Pung et al. |
| 2002/0154360 A1 | 10/2002 | Liu |
| 2002/0159114 A1 | 10/2002 | Sahasrabuddhe et al. |
| 2002/0186433 A1 | 12/2002 | Mishra |
| 2002/0186695 A1 | 12/2002 | Schwartz et al. |
| 2002/0196808 A1 | 12/2002 | Karri et al. |
| 2003/0002499 A1 | 1/2003 | Cummings et al. |
| 2003/0009582 A1 | 1/2003 | Qiao et al. |
| 2003/0016411 A1 | 1/2003 | Zhou et al. |
| 2003/0031198 A1 | 2/2003 | Currivan et al. |
| 2003/0037297 A1 | 2/2003 | Araki |
| 2003/0039007 A1 | 2/2003 | Ramadas et al. |
| 2003/0043430 A1 | 3/2003 | Handelman |
| 2003/0048506 A1 | 3/2003 | Handelman |
| 2003/0053475 A1 | 3/2003 | Veeraraghavan et al. |
| 2003/0067880 A1 | 4/2003 | Chiruvolu |
| 2003/0099243 A1 | 5/2003 | Oh et al. |
| 2003/0120799 A1 | 6/2003 | Lahav et al. |
| 2003/0189933 A1 | 10/2003 | Ozugur et al. |
| 2003/0198226 A1 * | 10/2003 | Westberg .................. 370/393 |
| 2003/0198471 A1 * | 10/2003 | Ovadia .................. 398/47 |
| 2003/0214979 A1 | 11/2003 | Kang et al. |
| 2004/0004966 A1 | 1/2004 | Foster et al. |
| 2004/0052525 A1 | 3/2004 | Ovadia |
| 2004/0062263 A1 | 4/2004 | Charcranoon et al. |
| 2004/0120261 A1 | 6/2004 | Ovadia |
| 2004/0131061 A1 | 7/2004 | Matsuoka et al. |
| 2004/0156325 A1 | 8/2004 | Perkins et al. |
| 2004/0156390 A1 | 8/2004 | Prasad et al. |
| 2004/0165537 A1 * | 8/2004 | Lee et al. .................. 370/252 |
| 2004/0170165 A1 | 9/2004 | Maciocco et al. |
| 2004/0170431 A1 | 9/2004 | Maciocco et al. |
| 2004/0208171 A1 | 10/2004 | Ovadia et al. |
| 2004/0208172 A1 | 10/2004 | Ovadia et al. |
| 2004/0208544 A1 | 10/2004 | Ovadia |
| 2004/0208554 A1 | 10/2004 | Wakai et al. |
| 2004/0234263 A1 | 11/2004 | Ovadia et al. |
| 2004/0252995 A1 | 12/2004 | Ovadia et al. |
| 2004/0258407 A1 | 12/2004 | Maciocco et al. |
| 2004/0264960 A1 | 12/2004 | Maciocco et al. |
| 2005/0030951 A1 | 2/2005 | Maciocco et al. |
| 2005/0063701 A1 | 3/2005 | Ovadia et al. |
| 2005/0068968 A1 | 3/2005 | Ovadia et al. |
| 2005/0068995 A1 | 3/2005 | Lahav et al. |
| 2005/0089327 A1 | 4/2005 | Ovadia et al. |
| 2005/0105905 A1 | 5/2005 | Ovadia et al. |
| 2005/0152349 A1 | 7/2005 | Takeuchi et al. |
| 2005/0175183 A1 | 8/2005 | Ovadia et al. |
| 2005/0175341 A1 | 8/2005 | Ovadia |
| 2005/0177749 A1 | 8/2005 | Ovadia |
| 2005/0259571 A1 | 11/2005 | Battou |
| 2006/0008273 A1 | 1/2006 | Xue et al. |

FOREIGN PATENT DOCUMENTS

| | | |
|---|---|---|
| CN | 1406000 | 3/2003 |
| CN | 1426189 | 6/2003 |
| EP | 0876076 | 11/1998 |
| EP | 1073306 | 1/2001 |
| EP | 1073307 | 1/2001 |
| EP | 1089498 | 4/2001 |
| EP | 1122971 | 8/2001 |
| EP | 1135000 | 9/2001 |
| EP | 1217862 | 6/2002 |
| EP | 1303111 | 4/2003 |
| EP | 1351458 | 10/2003 |
| WO | WO 01/19006 | 3/2001 |
| WO | WO 01/67694 | 9/2001 |
| WO | WO 01/76160 | 10/2001 |
| WO | WO 01/86998 | 11/2001 |
| WO | WO 02/41663 | 5/2002 |
| WO | WO 02/067505 | 8/2002 |

OTHER PUBLICATIONS

Wei, John Y., "Just-in-Time Switching and NGI SuperNet Network Control Research", Oct. 26, 1998, Bellcore.

Banerjee, Ayan et al., "Generalized Multiprotocol Label Switching: An Overview of Signaling Enhancements and Recovery Techniques", Topics of Internet Technology, Jul. 2001, pp. 144-151, IEEE Communications Magazine.

O'Mahony, Mike J. et al., "The Application of Optical Packet Switching in Future Communication Networks", IEEE Communications Magazine, Mar. 2001, pp. 128-135.

Yao, Shun et al., "All-Optical Packet Switching for Metropolitan Area Networks: Opportunities and Challenges", IEEE Communications Magazine, Mar. 2001, pp. 142-148.

Qiao, Chunming Dr. et al., "Optical Burst Switching", Business Briefing: Global Photonics Applications and Technology, 1999, pp. 108-112.

Qiao, Chunming "Labeled Optical Burst Switching for IP-over-WDM Integration", IEEE Communications Magazine, Sep. 2000, pp. 104-114.

Carena, A. et al., "OPERA: An Optical Packet Experimental Routing Architecture with Label Swapping Capability", Journal of Lightwave Technology, vol. 16, No. 12, Dec. 1998, pp. 2135-2145.

Zhong, Wen De, "A New Wavelength-Routed Photonic Packet Buffer Combining Traveling Delay Lines with Delay-Line Loops", Journal of Lightwave Technology, vol. 19, No. 8, Aug. 2001, pp. 1085-1092.

Wiesmann, D. et al., "Apodized Surface-Corrugated Gratings with Varying Duty Cycles", IEEE Photonics Technology Letters, vol. 12, No. 6, Jun. 2000, pp. 639-640.

Hill, Kenneth O. et al., "Fiber Bragg Grating Technology Fundamentals and Overview", Journal of Lightwave Technology, vol. 15, No. 8, Aug. 1997, pp. 1263-1276.

Erdogan, Turan, "Fiber Grating Spectra", Journal of Lightwave Technology, vol. 15, No. 8, Aug. 1997, pp. 1277-1294.

Sugden, K. et al., "Fabrication and Characterization of Bandpass Filters Based on Concatenated Chirped Faber Gratings", Journal of Lightwave Technology, vol. 15, No. 8, Aug. 1997, pp. 1424-1432.

Giles, C.R., "Lightwave Applications of Fiber Bragg Gratings", Journal of Lightwave Technology, vol. 15, No. 8, Aug. 1997, pp. 1391-1404.

Willner, A. E. et al., "Tunable Compensation of Channel Degrading Effects Using Nonlinearly Chirped Passive Fiber Bragg Gratings", IEEE Journal of Selected Topics in Quantum Electronics, vol. 5, No. 5 Sep./Oct. 1999, pp. 1298-1311.

Studenkov, P.V. et al., "Asymmetric Twin-Waveguide 1.55 μm Wavelength Laser with a Distributed Bragg Reflector", IEEE Photonics Technology Letters, vol. 12., No. 5, May 2000, pp. 468-470.

Shibata, Yasuo et al., "Coupling Coefficient Modulation of Waveguide Grating Using Sampled Grating", IEEE Photonics Technology Letters, vol. 6, No. 10, Oct. 1994, pp. 1222-1224.

Chaskar, H. et al., "Robust Transport of IP Traffic Over WDM Using Optical Burst Switching," Optical Networks Magazine, Jul./Aug. 2002, pp. 47-60.

Oh, Se-Yoon et al., "A Data Burst Assembly Algorithm in Optical Burst Switching Networks," ETRI Journal, vol. 24, No. 4, Aug. 2002, pp. 311-322, Electronics and Telecommunications Research Institute, Tejon, Korea.

IETF Network Working Group RFC Standards Track, "Generalized Multi-Protocol Label Switching (GMPLS) Signaling Functional Description," Jan. 2003. Retrieved on Jul. 8, 2004 from http://www.ietf.org/rfc/rfc3471.txt.

Liu, Hang et al., "GMPLS-Based Control Plane for Optical Networks: Early Implementation Experience," Proceedings of the SPIE, vol. 4872, Jul. 29, 2002, pp. 220-229, SPIE, Bellingham, VA, US.

Greg Bernstein et al., "OIF UNI 1.0—Controlling Optical Networks", info@oiforum.com, 2001, pp. 1-3.

(Abstract), "MPLS Technologies for IP Networking Solution", 2001, pp. 1-5.

Gallaher, Rick, "An Introduction to MPLS", Course Director for Global Knowledge and President of Telecommunications Technical Services, Inc., Sep. 10, 2001, pp. 1-7.

"Compare SANs to Alternate Technologies", Brocade, Retrieved on Feb. 26, 2003 from http://www.brocade.com/san/evaluate/compare_san.jsp.

Khattar, Ravi Kumar et, "Introduction to Storage Area Network, SAN", International Technical Support Organization, Aug. 1999, www.redbooks.ibm.com.

Sahara, A. et al., "Demonstration of Optical Burst Data Switching Using Photonic MPLS Routers Operated by GMPLS Signaling," OFC 2003, vol. 1, pp. 220-222.

Qiao, C. et al., "Polymorphic Control for Cost-Effective Design of Optical Networks", European Transactions on Telecommunications, vol. 11, No. 1, Jan.-Feb. 2000, pp. 17-26.

Baldine, I. et al., "Jumpstart: A Just-in-Time Signaling Architecture for WDM Burst-Switched Networks", IEEE Communications Magazine, Feb. 2002, pp. 82-89.

Comellas, J. et al., "Integrated IP/WDM Routing in GMPLS-Based Optical Networks", IEEE Network, Mar./Apr. 2003, pp. 22-27.

Cidon, I. et al., "Connection Establishment in High-Speed Networks", IEEE/ACM Transactions on Networking, No. 4, Aug. 1993, pp. 469-481.

"Generalized Multiprotocol Label Switching (GMPLS)", Copyright © The International Engineering Consortium, Web ProForum Tutorials http://www.iec.org, 2005, pp. 1-27.

Floyd, Sally et al., "Modifying TCP's Congestion Control for High Speeds", May 5, 2002, pp. 1-5.

Fredj, Ben S. et al., "Statistical Bandwidth Sharing: A Study of Congestion at Flow Level", France Telecom R&D, 2001, pp. 111-122.

Zeukovic, Nada et al., "A Simulation Analysis of Statistical Multiplexing in Frame Relay and ATM Internworking", TELESIKS 2001, Sep. 19-21, 2001, Nis, Yugoslavia, pp. 116-119.

Kumaran, Krishnan et al., "Multiplexing Regulated Traffic Streams: Design and Performance", Bell Laboratories/Lucent Technologies, IEEE INFOCOM 2001, pp. 527-536.

Su, C.-F. et al., "On Statistical Multiplexing, Traffic Mixes, and VP Management", University of Texas at Austin, 1998 IEEE.

Brown, Timothy X., "Adaptive Statistical Multiplexing for Broadband Communitcation", Performance Evaluation and Application of ATM Networks, Kouvatsos, D. editor, Kluwer, 2000, pp. 51-80.

Walch, Philip F., "FEC Standards and Long Haul STM-64 DWDM Transmission," Contribution to T1 Standards Project T1X1.5, Jan. 17-20, 2000, pp. 1-4.

"ITU-T Rec. G.709/Y.133—Interfaces for the Optical Transport Network (OTN)," International Telecommunication Union, Mar. 2003, pp. 1-109.

Henderson, Michael P., "Forward Error Correction in Optical Network," Mar. 27, 2001. http://members.cox.net/michaeo.henderson/Papers/Optical_FEC.pdf, pp. 1-18.

Wei, Wei et al., "GMPLS-Based Hierarchical Optical Routing Switching Architecture", Proceedings of SPIE, vol. 4585, 2001, pp. 328-334.

Banerjee, A. et al., "Generalized Multiprotocol Label Switching: An Overview of Routing and Management Enhancements," IEEE Communications Magazine, Jan. 2001, pp. 144-150.

Kim, Y. et al., "Discrete Event Simulation of the DiffServ-over-MPLS with NIST GMPLS Lightwave Agile Switching Simulator (GLASS)," Joint Conference of Communication and Information -2002, Jeju, Korea, 4 pgs.

Cao, Xiaojun et al., "Assembling TCP/IP Packets in Optical Burst Switched Networks", IEEE Global Telecommunications Conference, 2002, pp. 2808-2812, vol. 1, New York.

Wang, S.Y., "Using TCP Congestion Control to Improve the Performance of Optical Burst Switched Networks", IEEE International Conference on Communications, 2003, pp. 1438-1442, Taiwan.

Detti, Andrea et al., "Impact of Segments Aggregation on TCP Reno Flows in Optical Burst Switching Networks", IEEE Infocom, 2002, pp. 1803-1805, vol. 1, New York.

Ghani, Nasir et al., "On IP-over-WDM Integration", IEEE Communications Magazine, Mar. 2000, pp. 72-84.

Yoo, S.J. Ben, "Optical-label switching, MPLS, MPLambdaS, and GMPLS", Optical Networks Magazine, May/Jun. 2003, pp. 17-31.

Rekhter, Y. et al., "A Border Gateway Protocol 4 (BGP-4)", Network Working Group, Mar. 1995, pp. 1-57.

Jacob et al., "Delay Performance of Some Scheduling Strategies in an Input Queuing ATM with Multiclass Bursty Traffic," IEEE/ACM Transactions on Networking, vol. 4, No. 2, Apr. 1996, pp. 258-271.

Yoo et al., "Optical Burst Switching for Service differentiation in the Next-Generation Optical Internet," IEEE, Feb. 2001, pp. 98-104.

Guillemot et al., "Transparent Optical Packet Switching: The European ACTS KEOPS Project Approach," IEEE 1998, Journal of Lightwave Technology, vol. 16, No. 12, Dec. 1998, pp. 2117-2126.

Gambini et al., "Transparent Optical Packet Switching: Network Architecture and Demonstrators in the KEOPS Project," IEEE Journal of Selected Areas in Communications, vol. 16, No. 7, Sep. 1998, pp. 1245-1259.

Mehorta, Pronita, et al., "Network Processor Design for Optical Burst Switched Networks," Proceedings of the 14th Annual IEEE International ASIC/SOC Conference, Sep. 12-15, 2001, pp. 296-300.

Ovadia, Shlomo et al., "Photonic Burst Switching (PBS) Architecture for Hop and Span-Constrained Optical Networks," IEEE Optical Communications, vol. 41, No. 11, Nov. 2003, pp. S24-S32.

* cited by examiner

HYBRID OPTICAL BURST SWITCHING WITH FIXED TIME SLOT ARCHITECTURE

CROSS REFERENCE TO RELATED APPLICATIONS

The present application is related to U.S. patent application Ser. No. 10/674,650, filed Sep. 30, 2003, entitled "OPTICAL-SWITCHED (OS) NETWORK TO OS NETWORK ROUTING USING EXTENDED BORDER GATEWAY PROTOCOL," and U.S. patent application Ser. No. 10/636,062, filed Aug. 06, 2003, entitled "RESERVATION PROTOCOL SIGNALING EXTENSIONS FOR OPTICAL SWITCHED NETWORKS," both of which are assigned to the Assignee of the present application.

TECHNICAL FIELD

This disclosure relates generally to optical networks, and in particular but not exclusively, relates to optical burst switching networks.

BACKGROUND INFORMATION

Transmission bandwidth demands in telecommunication networks (e.g., the Internet) appear to be ever increasing and solutions are being sought to support this bandwidth demand. One solution to this problem is to use fiber-optic networks, where wavelength-division-multiplexing ("WDM") technology is used to support the ever-growing demand in optical networks for higher data rates.

Conventional optical switching networks typically use wavelength routing techniques, which require optical-to-electrical-to-optical ("O-E-O") conversions of optical signals at each optical switching node. O-E-O conversions at each switching node in the optical network is not only a very slow operation (typically about ten milliseconds), but it is very costly, and potentially creates a traffic bottleneck for the optical switched network. In addition, the current optical switching technologies cannot efficiently support "bursty" traffic that is often experienced in packet based communication applications (e.g., the Internet).

Recently, optical burst switching ("OBS") schemes have emerged as a promising solution to support high-speed bursty data traffic over WDM optical networks. The OBS scheme offers a practical opportunity between the current optical circuit-switching and the emerging all optical packet switching technologies. It has been shown that under certain conditions, the OBS scheme achieves high-bandwidth utilization and class-of-service ("CoS") by elimination of electronic bottlenecks as a result of O-E-O conversions occurring at switching nodes, and by using a one-way end-to-end bandwidth reservation scheme with variable time slot duration provisioning scheduled by the ingress nodes.

However, current signaling protocols, such as Just-In-Time ("JIT") signaling, Just-Enough-Time ("JET") signaling, or other one-way reservation protocols, employed to reserve network and device resources and to setup and teardown burst paths over OBS networks are complex and resource intensive. As such, expensive hardware, including powerful network processors and vast amounts of memory for tracking reservation protocol states, are required in each switching node of an OBS network. Despite the complexity of these signaling protocols, low loss of optical packets cannot be guaranteed. Furthermore, JIT and JET signaling are intimately wrapped up with the task of scheduling data packets for transmission. As such, JIT and JET are inflexible solutions that prevent easy modification of the signaling protocol or scheduling algorithm used at a given time on an OBS network.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for a hybrid optical burst switching ("OBS") network using fixed length optical cells are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In short, embodiments of the present invention combine the high bandwidth capability of an OBS network with the simplicity of cell switching techniques to provide a hybrid OBS network. Instead of switching on the boundaries of variable length optical bursts, techniques are described herein for switching on the boundaries of fixed length optical cells without using a dynamic reservation algorithm. Rather, embodiments of the present invention replace the dynamic reservation algorithm with time slots (a.k.a. fixed length optical cells) assigned to edge nodes. Embodiments of the present invention take advantage of less hardware intensive signaling protocols, such as Resource Reservation Protocol-Traffic Engineering ("RSVP-TE") or the like, to establish coarse-grain (e.g., minutes, hours, days, or longer) optical paths across the hybrid OBS network. Furthermore, embodiments of the present invention describe an ingress node architecture that isolates the signaling protocols for establishing optical paths from scheduling algorithms that determine the order in which inbound data streams are serviced. Embodiments of the present invention tradeoff overall data throughput and scalability for the simplicity derived from fixed length optical cells, assigned time slots, and other advantages described herein. The techniques described herein are well suited for small optical networks. These and other embodiments are described in detail below.

Figure 1:
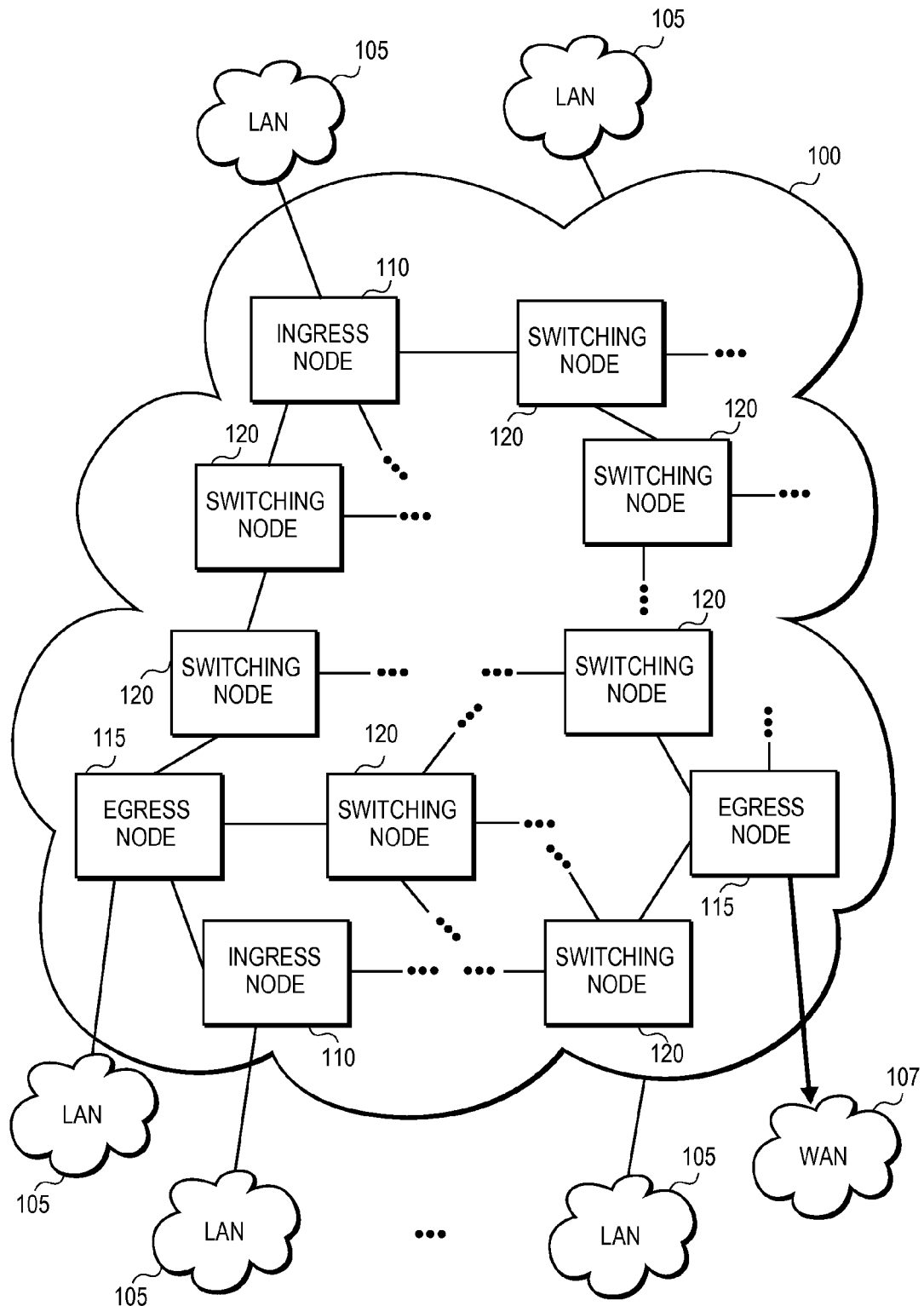
FIG. 1 is a block diagram illustrating a hybrid optical burst switching network for switching fixed length optical cells, in accordance with an embodiment of the present invention.

FIG. 1 is a block diagram illustrating a hybrid optical burst switching ("OBS") network 100 for switching fixed length optical cells, in accordance with an embodiment of the present invention. FIG. 1 further illustrates local area networks ("LANs") 105 and a wide area network ("WAN") 107 communicatively coupled to hybrid OBS network 100 to send and to receive data streams thereto/therefrom.

Hybrid OBS network 100 is a type of optical switching network. The illustrated embodiment of hybrid OBS network 100 includes ingress nodes 110, egress nodes 115, and switching nodes 120. Hybrid OBS network 100 can include more or less ingress nodes 110, egress nodes 115, or switching nodes 120 that are interconnected via switching nodes 120, as illustrated. Ingress nodes 110 and egress nodes 115 are also referred to as edge nodes in that they logically reside at the edge of hybrid OBS network 100. The edge nodes provide an interface between hybrid OBS network 100 and LANs 105 and WAN 107 and switching nodes 120.

LANs 105 and WAN 107 can be either optical networks or electrical networks. Therefore, in some embodiments, ingress nodes 110 may perform optical-to-electrical ("O-E") conversions of inbound data streams. Ingress nodes 110 may further include electronic memory to buffer the inbound data streams as data blocks until the data blocks are ready to be transmitted to one of switching nodes 120 for transmission to one of egress nodes 115. In some embodiment, ingress nodes 110 may perform electrical-to-optical ("O-E") conversion of the buffered data blocks prior to transmitting the data block as an optical burst to one of switching nodes 120.

Egress nodes 115 are implemented with optical switching modules that are configured to receive optical bursts from switching nodes 120 and route the data streams contained therein to LANs 105, WAN 107, or other external networks. In one embodiment, egress nodes 115 perform O-E-O conversions of received optical bursts. To perform the O-E-O conversions, egress nodes 115 may include electronic memory to buffer the data bursts as data blocks prior to forwarding the data blocks as data streams to an external network. Although ingress nodes 110 and egress nodes 110 have been illustrated as separate entities, it should be appreciated that ingress nodes 110 and egress nodes 115 illustrate separate functionalities that may be implemented within a single hardware device or edge node.

Switching nodes 120 are implemented with optical switching modules that are each configured to receive an optical burst from either one of ingress nodes 110 or another switching node 120 and appropriately route the optical burst to another switching node 120 or to one of egress nodes 115. Switching nodes 120 switch optical bursts on the boundaries of fixed length optical cells per carrier wavelength, where each carrier wavelength can have its own fixed optical cell length thus providing traffic differentiation capabilities, as opposed to variable length optical bursts. Switching on fixed length time slots (e.g., optical cells) simplifies the task of reserving resources along an optical path within hybrid OBS network 100. Thus, less expensive hardware and simpler routing/signaling protocols may be used.

Switching nodes 120 determine where to route an optical burst via control signals issued over a control plane, which establish optical paths through hybrid OBS network 100 (discussed in detail below). In one embodiment, the optical paths are established in advance of ingress nodes 110 receiving data streams from the external networks. In one embodiment, these optical paths are established during a setup and configuration period of hybrid OBS network 110 and persist until a management station (not illustrated) coupled to the control plane reconfigures the optical paths. Furthermore, in some embodiments, the management station assigns fixed slot sizes (e.g., optical cell sizes) to each carrier wavelength on hybrid OBS network 100 during this initial setup and configuration period. The fixed slot sizes assigned to each carrier wavelength may be used by the edge nodes (e.g., ingress nodes 110 and egress nodes 115) to appropriately assign traffic types for transmission on each of the carrier wavelengths. The management station also assigns positions to each optical cell relative to a time offset for specific edge nodes (i.e. an edge node can only transmit during its assigned time slots or optical cells).

Hybrid OBS network 100 may use wavelength-division-multiplexing ("WDM") to multiplex inbound data streams onto multiple wavelengths. In some embodiments, the control signals are optical control signals propagated on pre-selected carrier wavelengths out-of-band ("OOB") of the data plane propagating optical bursts carrying the data streams. In some embodiments, the control plane is a separate electrical network, such as an Ethernet. The control plane is often referred to as the slow path, since it does not support the high bandwidths available in the data plane, which is often referred to as the fast path. In yet other embodiments, the control signals are propagated in band on the data plane using different encoding schemes, such as different modulation formats, using a recognizable header, or the like. It should be appreciated that embodiments of the present invention should not be limited by the techniques used to convey control signals for establishing optical paths.

Figure 2:
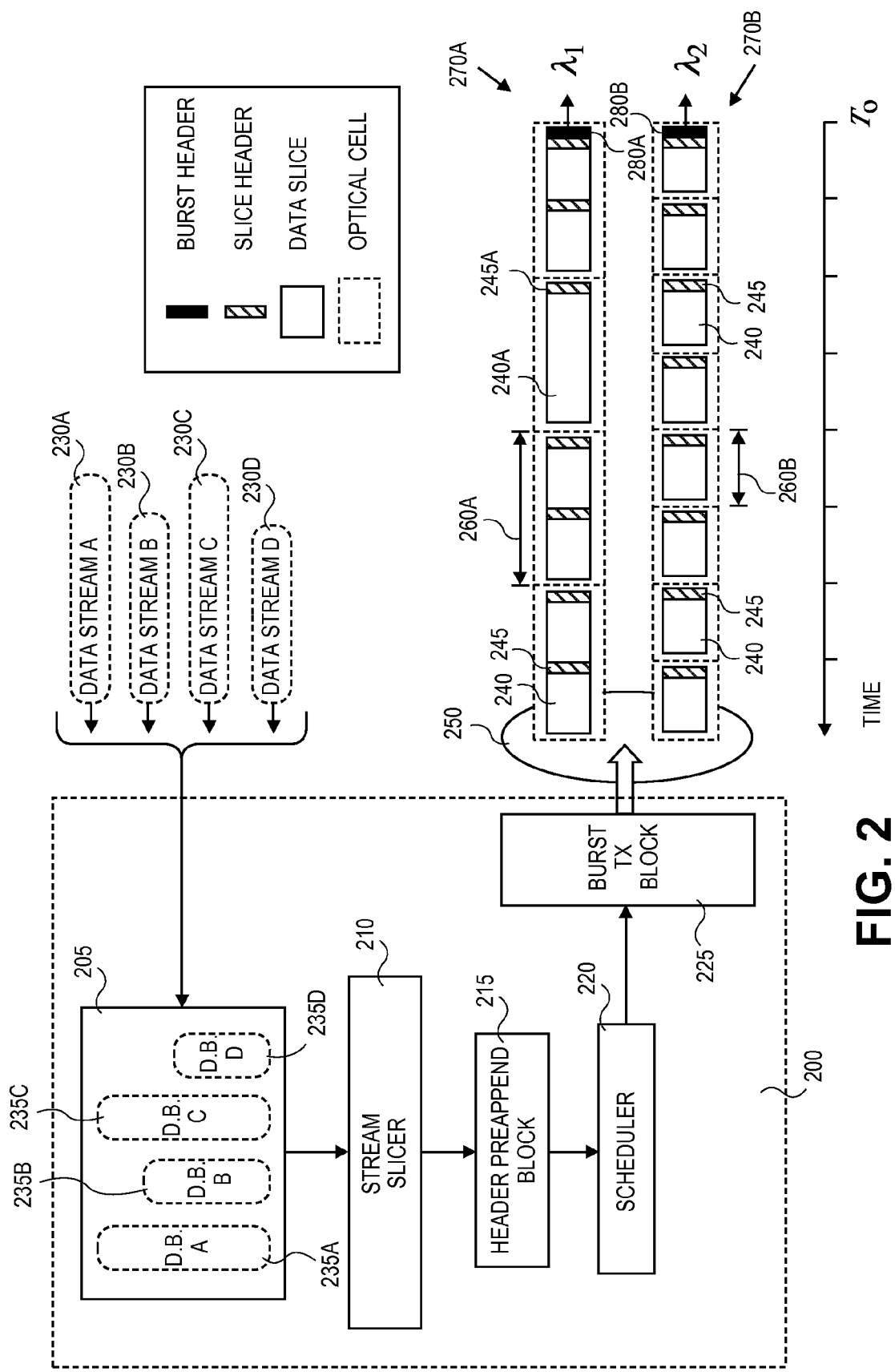
FIG. 2 is a block diagram illustrating functional blocks of an ingress node for generating optical bursts having fixed length optical cells, in accordance with an embodiment of the present invention.

FIG. 2 is a block diagram illustrating functional blocks of an ingress node 200 for generating optical bursts having fixed length optical cells, in accordance with an embodiment of the present invention. Ingress node 200 is an exemplary embodiment of one of ingress nodes 110. The illustrated embodiment of ingress node 200 includes a buffer 205, a stream slicer 210, a header pre-append block 215, a scheduler 220, and a burst transmit block 225.

In short, ingress node 200 operates as follows. Ingress node 200 receives data streams 230 and temporarily stores data streams 230 as data blocks 235. Stream slicer 210 slices data blocks 235 into data slices 240. Header pre-append block 215 generates slice headers 245 for each data slice 240 and appends slice headers 245 thereto. Scheduler 220 schedules each data slice 240 with its pre-appended slice header 245 to be transmitted during fixed time slots, illustrated as optical cells 260A and 260B (collectively referred to as optical cells 260). Scheduler 220 may schedule data slices 240 for one or more data blocks 235 at once to generate one or more complete optical bursts, such as optical bursts 270A and 270B (collectively referred to as optical bursts 270). Once an entire optical burst has been prepared and scheduled, burst transmit block 225 converts the scheduled data slices 240 from the electrical realm to the optical realm and launches the optical bursts 270A and 270B onto a fiber link 250 for transmission to one of switching nodes 120. As illustrated in FIG. 2, each of optical bursts 270A and 270B may be modulated on different carrier wavelength. Furthermore, each carrier wavelength may transmit optical cells having a different length, though the length of each optical cell for a given carrier wavelength is constant throughout hybrid OBS network 100. It is important to note that each optical burst 270 may vary in overall length, but only increments equal to its optical cell size. Thus, optical bursts 270 have boundaries aligned with fixed length time slots (i.e., optical cells 260).

Figure 3:
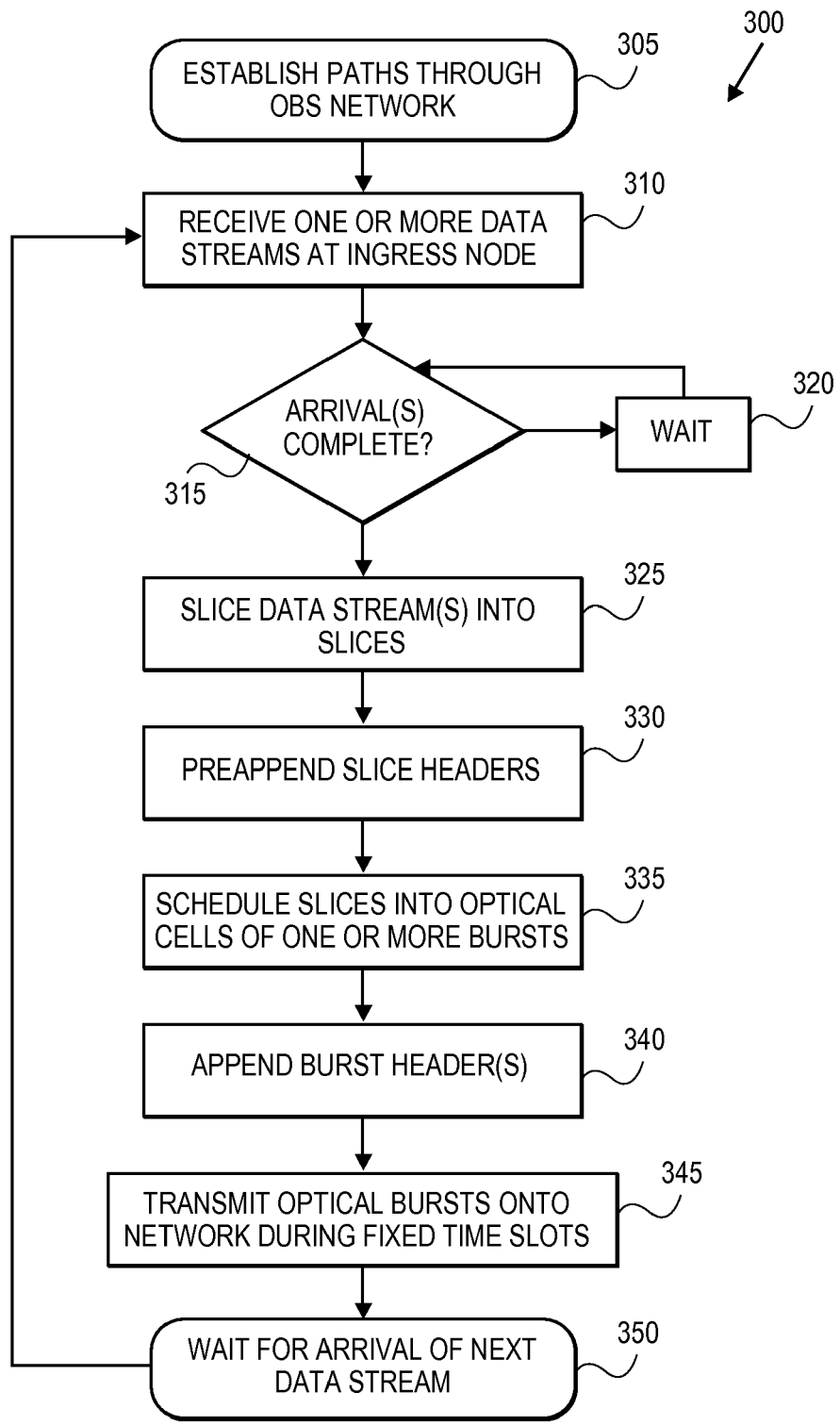
FIG. 3 is a flow chart illustrating a process for generating and transmitting fixed length optical cells over a hybrid optical burst switching network, in accordance with an embodiment of the present invention.

FIG. 3 is a flow chart illustrating a process 300 for generating and for transmitting data slices 240 within optical cells 260, in accordance with an embodiment of the present invention.

In a process block 305, the management station (not illustrated) executes a signaling protocol to establish optical paths through hybrid OBS network 100. In one embodiment, a signaling protocol called Resource Reservation Protocol-Traffic Engineering ("RSVP-TE"), with extensions appropriate for hybrid OBS network 100, is executed to reserve resources and establish optical paths. RSVP-TE may be used in connection with MultiProtocol Label Switching ("MPLS") to route control information (e.g., routing labels) to switching nodes 120 to support Generalized MultiProtocol Label Switching ("GMPLS"). More information on GMPLS signaling with RSVP-TE extensions can be found at http://www.ietf.org/rfc.html (RFC 3473). RSVP-TE is a relatively simple signaling protocol compared to Just-In-Time ("JIT") and Just-Enough-Time ("JET"). As such, RSVP-TE can be implemented with less expensive control plane hardware in each of switching nodes 120. It should be appreciated that any number of signaling protocols for establishing optical paths across hybrid OBS network 100 and reserving resources may be implemented in connection with embodiments of the present invention. Thus, the architecture of ingress node 200 described herein is advantageously flexible in terms of coarse grain signaling protocols implemented in connection therewith.

In the case of JIT and JET, scheduling data streams for transmission across an optical network is complex and difficult task that is susceptible to wasteful retransmissions due to scheduling conflicts. When an inbound data stream begins to pour into an ingress node from an external network, JIT and JET immediately commence establishing an optical path and reserving resources along the path for an estimated period of time. However, if the inbound data stream does not completely arrive until later than expected, transmission of an optical burst containing the data stream will not complete transmission across the optical network within the estimated period of time, for which resources have been reserved. Resultantly, the subsequent optical burst will be delayed causing failed transmissions and required retransmissions. Known OBS networks simply cannot guarantee low loss rates. However, embodiments of the present invention do not suffer from this Achilles' heel. Rather, the management station assigns optical cell sizes per carrier wavelength, as well as, the position of each optical cell to the edge nodes. These assignments prevent a node from transmitting an optical cell during time slot not assigned to the node. Since each optical cell 260 of an optical bursts 270 are transmitted during fixed time slots and only during these time slots, data collisions do not occur. Therefore, embodiments of the present invention can guarantee low loss rates.

Optical paths may be established during an initial setup and configuration of hybrid OBS network 100. These optical paths are coarse grain optical paths that may persist for minutes, hours, days, or as long as is desired, as opposed to sub-microsecond optical paths. In some embodiment, new optical paths may be established anytime and currently established paths liquidated under the control of the management station. However, embodiments of the present invention need not setup and tear down a new optical path for each optical burst 270 launched into hybrid OBS network 100. Using optical paths that persist over many optical bursts 270 reduces latency that occurs at ingress nodes 110, as optical bursts 270 need not wait for an optical path to be established. Thus, embodiments of the present invention may be used in connection with "light weight" signaling protocols for establishing optical paths and reserving resources. This coarse grain optical path switching further provide simplicity of implementation at the expense of dynamic path switching and efficiency.

In a process block 310, ingress node 200 receives one or more data streams 230. As data streams 230 pour into ingress node 200 from external networks (e.g., LANs 105 or WAN 107), the data streams are temporarily stored within buffer 205 as data blocks 235. In one embodiment, ingress node 200 buffers an entire data stream 230 before commencing transmission of the data stream 230 as an optical burst 270 over hybrid OBS network 100. Thus, if ingress node 200 determines that a complete data block 235 has not yet been received, ingress node 200 continues to wait in a process block 320. In some embodiments, ingress node 200 may wait for several data streams 230 to be completely buffered in buffer 205 prior to generating one or more optical bursts 270.

In a process block 325, stream slicer 210 slices data blocks 235 into data slices 240. The lengths of the data slices 240 may vary based on hardware constraints, network optimizations, and the like. Data slices 240 may all have the same length with the possible exception of one data slice 240 per optical burst 270 to accommodate a burst header (discussed more below) or stream slicer 210 may scale the size of data slices 240 according to the length of optical cells 260. For example, a data slice 240A may be sliced by stream slicer 210 such that data slice 240A spans the entire length of a single optical cell 260A with only a single slice header 245A.

In a process block 330, header pre-append block 215, generates a slice header 245 for each data slice 240 chopped by stream slicer 210. Slice headers 245 are used by down stream entities, such as egress node 115 or a destination user, to reassemble data slices 240 into data blocks 235 or data streams 230. For example, if data slices corresponding to data stream 230A (and therefore data block 235A) are scheduled into different optical bursts 270, which in turn take different optical paths to a common destination, the data slices of data stream 230A may arrive at the destination out of order. Slice headers 245 contain ordering information to enable the destination to reassemble the data slices into data stream 230A without requiring retransmission thereof.

In one embodiment, slice headers 245 each include a fragment identifier ("ID") and a data stream ID. The fragment ID numbers the data slices of a particular data stream 230 so that the data stream 230 can be reassembled, as discussed above. The data stream ID identifies to which data stream 230 the data slice belongs. Including the data stream ID frees scheduler 220 to multiplex or schedule multiple data streams 230 onto one or more optical bursts 270 in any order desired to optimize bandwidth utilization.

In a process block 335, scheduler 220 schedules data slices 240 into optical cells 260 of one or more optical bursts 270. It should be appreciated that scheduler 220 can schedule data slices from one data stream 230 at a time or schedule data slices from multiple data streams 230 at a time. Furthermore, scheduler 220 can schedule data slices from a single data stream 230 into a single optical burst 270 or into multiple optical bursts 270. In the case where multiple optical bursts 270 are used, optical bursts 270 may be launched concurrently on separate carrier wavelengths (e.g., optical bursts 270A and 270B), launched in a staggered or time delay fashion, or launched one after another on the same carrier wavelength.

Embodiments of the present invention separate the task of scheduling slices into optical cells 260 from the tasks of establishing optical paths and reserving resources. As such, any desirable scheduling algorithm may be implemented, such as round robin scheduling, deficit round robin ("DRR") scheduling, weighted round robin ("WRR") scheduling, or the like. Implementation of priority based scheduling algorithms, such as WRR, enables guaranteed quality of service ("QoS"). The particular scheduling algorithm selected may be based on anticipated traffic profiles and demands. Furthermore, the scheduling algorithm may be adjusted or changed on the fly (in real-time) to respond to variable or bursty traffic patterns. Thus, it should be appreciated that separating the tasks of scheduling from routing and resource reservation results in increased flexibility and responsiveness to traffic demands.

Embodiments of the present invention transmit data streams 230 over hybrid OBS network 100 within optical bursts 270 formed of a variable number of fixed length optical cells 260. As such, hybrid OBS network 100 executes an optical cell-switching scheme. As is illustrated, data slices 240 are transmitted onto hybrid OBS network 100 within optical cells 260. Each optical cell 260 represents a fixed length time slot. Optical cells 260 have a uniform or constant length through hybrid OBS network 100 for each carrier wavelength (e.g., $\lambda_1$, or $\lambda_2$), but may vary from one carrier wavelength to the next. For example, FIG. 2 illustrates optical cells 260A of carrier wavelength $\lambda_1$ as being twice as long as optical cells 260B of carrier wavelength $\lambda_2$. Thus, embodiments of hybrid OBS network 100 enable multiple different optical cell lengths across various different carrier wavelengths. Having different optical cell lengths allows scheduler 220 to optimize the network utilization by scheduling inbound data streams 230 onto appropriately sized optical cell lengths. For instance, scheduler 220 may schedule a large data stream, such as data stream 230C, onto carrier wavelength $\lambda_1$, while scheduling a small data stream, such as data stream 230D, onto carrier wavelength $\lambda_2$. Again, the ability to schedule data slices from different data streams 230 into different optical cell lengths increases the flexibility and responsiveness of ingress node 200 to changing traffic profiles.

In a process block 340, ingress node 200 appends burst headers 280A and 280B to optical bursts 270A and 270B, respectively. A single burst header 280 is transmitted per burst 270. Burst headers 280 define information pertinent to each optical burst 270, such as burst ID, burst length (i.e., number of optical cells 260 within the current optical burst), an optional header error correction ("HEC") field, a cell loss priority ("CLP") field, and the like. The precise header format and available fields can be tailored to the needs of the specific implementation. In some embodiments, burst headers 280 are added to the first data slice of an optical burst by header pre-append block 215. In some embodiments, burst headers 280 are added to the first data slice of an optical burst by burst transmit block 225.

As can be seen from FIG. 2, stream slicer 210 must slice data blocks 235 into data slices 240 that, when appended with slice headers 245 (and in some cases burst headers 280), fit into optical cells 260. Relation 1 describes the relation between the optical cell length and the data slice size, OpticalCellSize ≧ k·(DataSliceSize+SliceHeaderSize)   Relation 1 where k=1, 2, 3 ... n. The greater the value of k, the more data slices 240 can fit into a single optical cell 260. Referring to FIG. 2, k=2 for optical cells 260A of optical burst 270A, and k=1 for optical cells 260B of optical burst 270B. It should be appreciated that k can have different values for different carrier wavelengths. Increasing k requires more expensive switching nodes 120 as they must be capable of handling larger optical cells at a time. Thus, k may be selected based on the hardware (e.g., ingress nodes 115, egress nodes 115, and switching nodes 120) available.

In some embodiments, relation 1 holds true for all optical cells 260, except the first optical cell in each optical burst 270. For the first optical cell, one of the data slices must be appropriately shorter to accommodate the burst header 280. In other embodiments, an additional optical cell 260 may be appended to the front of optical bursts 270 containing only the burst header. While the latter embodiment may make the task of slicing data slices 240 less complicated for stream slicer 210, it does so at the expense of bandwidth utilization.

Once scheduler 220 has completely scheduled all data slices 240 into optical cells 260, then burst transmit block 225 converts the data slices 240 from the electrical realm to the optical realm and launches the optical bursts 270 into fiber link 250. Once launched, optical bursts 270 flow to one of switching nodes 120 where optical bursts 270 are processed and routed during fixed time slots, one optical cell 260 per carrier wavelength at a time. Eventually optical bursts 270 will reach one of egress nodes 115 for delivery to an external network and ultimately to a final destination.

Once optical bursts 270 have been launched, process 300 continues to a process block 350. In process block 350, ingress node 200 waits until the next data stream or set of data streams are buffered to repeat process 300 from process block 310.

Figure 4:
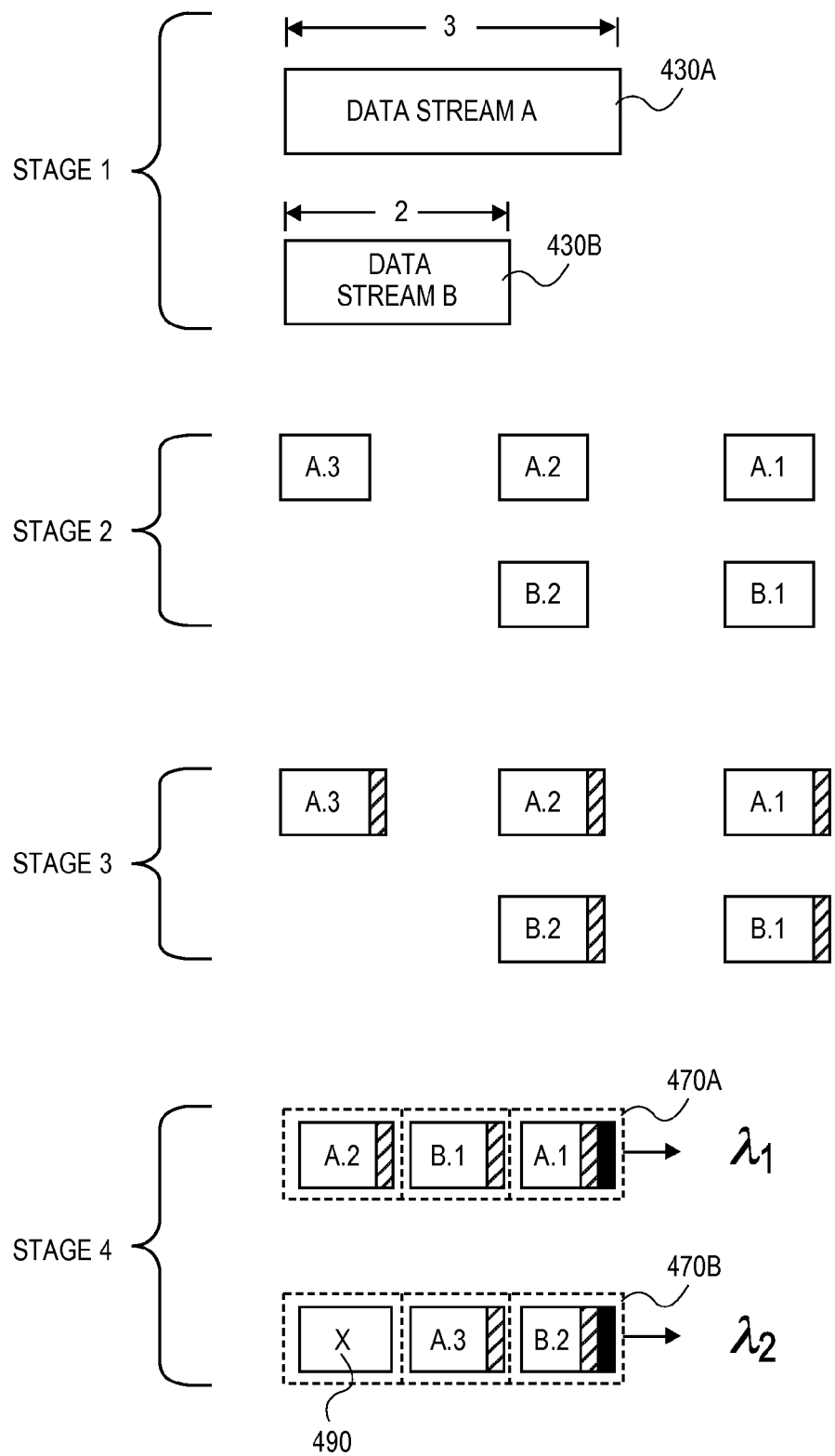
FIG. 4 is a diagram illustrating how to slice data streams into data slices and to insert the data slices into fixed length optical cells for transmission as an optical burst, in accordance with an embodiment of the present invention.

FIG. 4 is a graphic illustration of process 300 for generating and transmitting fixed length optical cells 260, in accordance with an embodiment of the present invention. Stage 1 illustrates two data streams 430A and 430B. Data stream 430A is three units long while data stream 430B is two units long. Data streams 430A and 430B are buffered within buffer 205 of ingress node 200. Stage 2 illustrates data streams 430A and 430B sliced into data slices A1-A3 and B1-B2, as described in connection with process block 325. Stage 3 illustrates data slices A1-A3 and B1-B2 having slice headers appended thereto. Finally, stage 4 illustrates data slices A1-A3 and B1-B2 scheduled into optical cells of two optical bursts 470A and 470B1. Optical burst 470A includes data slices A1, B1, and A2. Optical 470B includes data slices B2, A3, and an empty cell 490. The order of the data slices A1-A3 and B1-B2 is based upon the particular scheduling algorithm implemented by scheduler 220. Although the optical cells of optical bursts 470A and 470B are illustrated as having equal lengths, it should be appreciated that the lengths of each optical burst 470A and 470B can differ.

Figure 5:
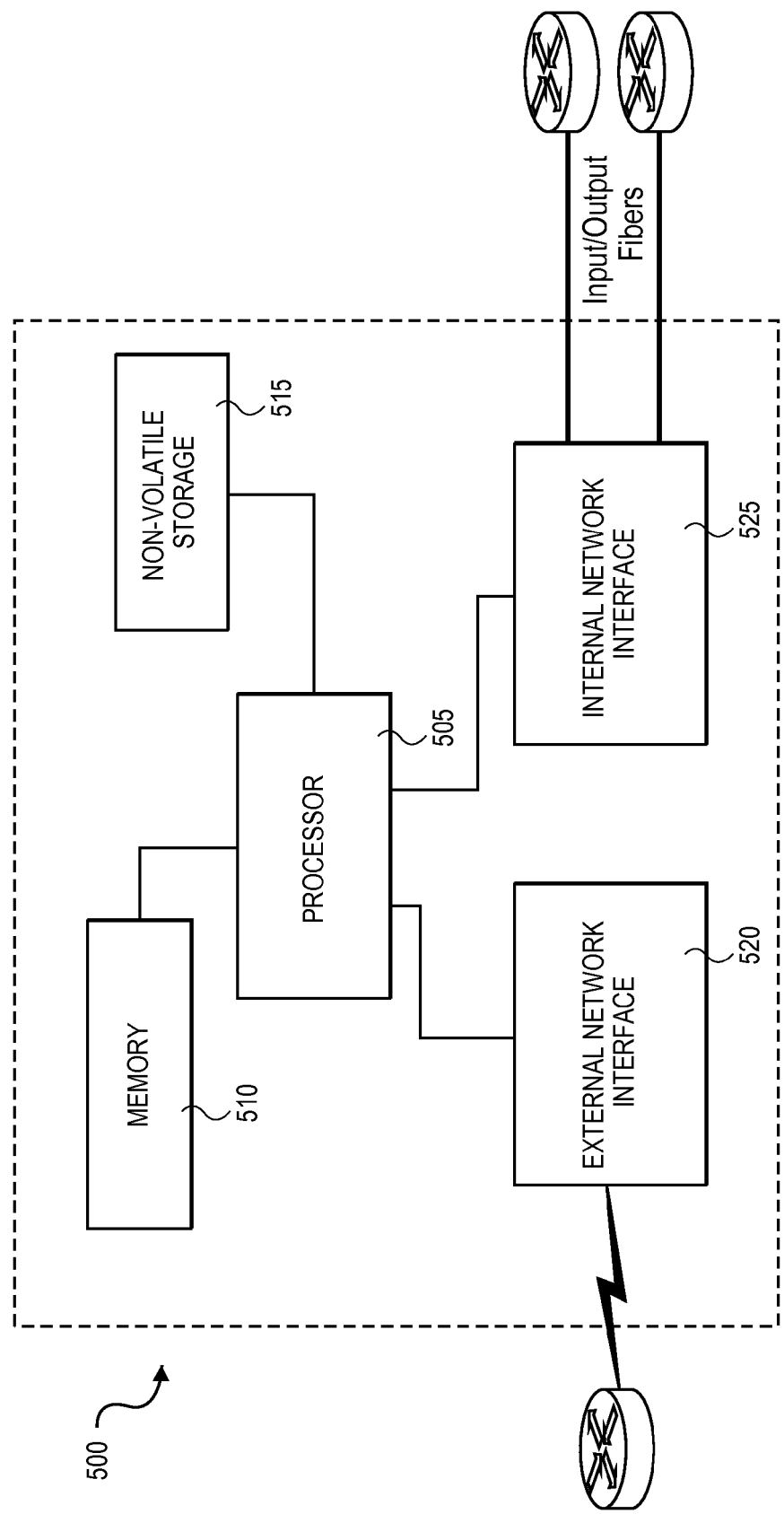
FIG. 5 is a block diagram illustrating hardware blocks of an edge node for generating optical bursts having fixed length optical cells, in accordance with an embodiment of the present invention.

FIG. 5 is a block diagram illustrating hardware blocks of an exemplary edge node 500, in accordance with an embodiment of the present invention. The illustrated embodiment of edge node 500 includes a processor 505, memory 510, non-volatile ("NV") storage 515, an external network interface 520, and an internal network interface 525.

External network interface 520 provides functionality for interfacing with one or more external networks (e.g., LANs 105, WAN 107, and the like). Internal network interface 525 provides functionality for interfacing with the internal infrastructure of hybrid OBS network 100. Internal network interface 525 will typically be coupled to one or more fiber links (e.g., fiber link 250) for sending and for receiving optical bursts to/from switching nodes 120. Inbound data streams are buffered within memory 510 and processed by processor 505. In one embodiment, processor 505 is a network processor including a plurality of pipelined micro-engines capable of processing multiple data streams in parallel. In one embodiment, each of the micro-engines corresponds to one of the functional blocks illustrated in FIG. 2 (e.g., stream slicer 210, header pre-append 215, scheduler 220, and burst transmit block 225). In some embodiments, some or all of these functional blocks are implemented in hardware. In some embodiments, some or all of these functional blocks are implemented in software executed by processor 505. In one embodiment, functionality for performing operations corresponding to the process and decision blocks illustrated in FIG. 3 are stored within NV storage 515 and executed by processor 505.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An edge node of an optical switching network, comprising:
    a stream slicer to slice a data block into data slices;
    a header pre-append block communicatively coupled to receive the data slices from the stream slicer and to append a slice header to each of the data slices;
    a scheduler coupled to schedule the data slices into fixed length time slots after an established optical path exists through the optical switching network; and
    a burst transmit block coupled to generate an optical burst for transmission onto the optical switching network, the optical burst to include the data slices with the appended slice headers, wherein the burst transmit block converts a group of the data slices from an electrical realm to an optical realm after the entire optical burst comprising the group of the data slices has been scheduled, wherein the burst transmit block is further coupled to generate the optical burst as a series of fixed length optical cells, each of the optical cells containing a fixed number of the data slices and appended slice headers, wherein the burst transmit block is further coupled to generate optical bursts through the established optical path through the optical switching network, wherein the established optical path includes a path defined by the execution of a Resource Reservation Protocol—Traffic Engineering ("RSVP-TE") signaling protocol, wherein the RSVP-TE signaling protocol includes a hybrid optical bursts switching ("OBS") network extension, wherein the scheduler schedules the data slices independent of the RSVP-TE signaling protocol.

2. The edge node of claim 1 wherein the scheduler is coupled to schedule additional data slices into additional optical bursts according to a scheduling algorithm for transmission on different carrier wavelengths through the optical switching network.

3. The edge node of claim 1, further comprising a buffer communicatively coupled to the stream slicer, the buffer to receive data streams from another network and buffer the data streams as the data blocks.

4. The edge node of claim 1, wherein the header pre-append block is further coupled to generate a fragment identifier ("ID") and a data stream ID for each of the data slices, the slice header comprising the fragment ID and the stream ID.

5. A system, comprising:
    an edge node to receive data streams from a first network, the edge node comprising:
        a stream slicer to slice the data streams into data slices;
        a header pre-append block to append a slice header to each of the data slices;
        a scheduler to schedule the data slices for transmission within fixed length optical cells; and
        a burst transmit block to generate optical bursts containing the fixed length optical cells, the optical bursts to be transmitted during fixed time slots, the burst transmit block to convert a group of the data slices from an electrical realm to an optical realm after an entire optical burst of the group of the data slices has been scheduled;
    an egress node optically coupled to receive the optical bursts and to deliver the data streams to a second network;
    a plurality of switching nodes optically coupled between the edge node and the egress node to route the data streams from the edge node to the egress node,
    wherein the scheduler schedules the data slices independently of a signaling protocol used to establish a path across the plurality of switching nodes, wherein the scheduler additionally schedules the data slices after the signaling protocol establishes the path across the plurality of switching nodes; and
    a management station to establish optical paths through the second network, wherein establishing the optical paths includes executing a Resource Reservation Protocol—Traffic Engineering ("RSVP-TE") signaling protocol, wherein the RSVP-TE signaling protocol includes a hybrid optical bursts switching ("OBS") network extension.

6. The system of claim 5 wherein the scheduler is further coupled to schedule the data slices from one of the data streams into multiple ones of the optical bursts according to a scheduling algorithm for transmission to the egress node, each of the optical bursts to be transmitted on a different carrier wavelength.

7. The system of claim 5 wherein the header pre-append block is further configured to generate a fragment identifier ("ID") and a data stream ID for each of the data slices, and wherein the slice header comprises the fragment ID and the stream ID.

8. The system of claim 7 wherein the egress node is further configured to reassemble the data slices of one of the data streams prior to delivering the one of the data streams to the second network, if the data slices arrive at the egress node out of order.

* * * * *